(12) United States Patent
Wu et al.

(10) Patent No.: US 9,225,272 B2
(45) Date of Patent: Dec. 29, 2015

(54) CONTROL CIRCUIT FOR SPEED AND ROTATIONAL DIRECTION OF FAN

(71) Applicant: ASIA VITAL COMPONENTS CO., LTD., Sinjhuang District, New Taipei (TW)

(72) Inventors: Wei-Fu Wu, New Taipei (TW); Wei-Tsai Huang, New Taipei (TW)

(73) Assignee: ASIA VITAL COMPONENTS CO., LTD., New Taipei (TW)

( * ) Notice: Subject to any disclaimer, the term of this patent is extended or adjusted under 35 U.S.C. 154(b) by 178 days.

(21) Appl. No.: 13/783,406

(22) Filed: Mar. 4, 2013

(65) Prior Publication Data

US 2014/0246996 A1 Sep. 4, 2014

(51) Int. Cl.
*H02P 1/00* (2006.01)
*H02P 6/00* (2006.01)
*H02P 6/08* (2006.01)

(52) U.S. Cl.
CPC ............... *H02P 6/003* (2013.01); *H02P 6/085* (2013.01)

(58) Field of Classification Search
USPC ........ 318/280, 281, 293, 54, 65, 400.35, 739, 318/256, 599
See application file for complete search history.

(56) References Cited

U.S. PATENT DOCUMENTS

| | | | | |
|---|---|---|---|---|
| 4,832,576 | A * | 5/1989 | Deguchi et al. | 417/45 |
| 6,310,453 | B1 * | 10/2001 | Lin | 318/445 |
| 6,424,798 | B1 * | 7/2002 | Kitamine | 388/800 |
| 6,956,342 | B1 * | 10/2005 | Fang | 318/400.08 |
| 6,967,459 | B2 * | 11/2005 | Hahn et al. | 318/599 |
| 7,023,152 | B2 * | 4/2006 | Sunaga et al. | 318/34 |
| 7,719,216 | B2 * | 5/2010 | Sato et al. | 318/400.04 |
| 2012/0234566 | A1 * | 9/2012 | Mashiko et al. | 173/93.5 |

* cited by examiner

*Primary Examiner* — Kawing Chan
*Assistant Examiner* — Jorge L Carrasquillo

(57) ABSTRACT

The present invention provides a control circuit for speed and rotational direction of a fan, including a signal conversion unit, a processing unit, and a drive unit. The signal conversion unit converts the received input signal into a DC level signal. The processing unit determines to generate a plurality of control signals for the fan based on the received DC level signal and at least one preset voltage therein to drive the drive unit, further controlling the rotational speed or clockwise/counter-clockwise rotation of the fan, whereby to reduce the cost and increase the layout space.

9 Claims, 4 Drawing Sheets

CONTROL CIRCUIT FOR SPEED AND ROTATIONAL DIRECTION OF FAN

BACKGROUND OF THE INVENTION

1. Field of the Invention

The present invention relates to a control circuit and in particular to a control circuit for speed and rotational direction of a fan, which produces the effect of cost reduction and an increase in the layout space.

2. Description of Prior Art

Motor technology plays a critical role in the development of a modern automated technology. Specially applied to the fan, the motor drives the fan to rotate and stimulate airflow, achieving the effect of heat dissipation. Therefore, it is quite suitable for heat dissipation of electronic products in electronic industry.

Please refer to FIG. 1, which is a control circuit of the prior art for a three-phase DC brushless motor. The control circuit includes a signal conversion unit 10, a direction determining unit 11, a microprocessor 12, and a drive unit 14. The signal conversion unit 10 receives a PWM (Pulse Width Modulate) signal at its input end and converts the PWM signal into a DC level signal. The DC level signal is then transmitted to the rotational speed pin 121 connected to the microprocessor 12 through the output end of the signal conversion unit 10 such that the microprocessor 12 generates a control signal based on the received DC level signal and the drive unit 14 drives and controls the rotational speed of the fan 16 based on the received control signal.

The above-mentioned direction determining unit 11 receives an input signal at its one end and the other end thereof is connected to the rotational direction pin 122 of the microprocessor 12 such that the direction determining unit 11 performs the determining process based on the received input signal. If the input signal is determined to be clockwise, a clockwise signal is generated and transmitted to the microprocessor 12 such that the microprocessor 12 generates another control signal to the drive unit 14 based on the received clockwise signal to make the drive unit 14 drive and control the clockwise rotation of the fan 16 based on the received control signal. If the input signal is determined to be counter-clockwise, a counter-clockwise signal is generated and transmitted to the microprocessor 12 such that the microprocessor 12 generates another control signal to the drive unit 14 based on the received counter-clockwise signal to make the drive unit 14 drive and control the counter-clockwise rotations of the fan 16 based on the another received control signal.

Though the control circuit of the prior art for the three-phase DC brushless motor can achieve the effect of controlling the speed and rotational direction of the fan 16, another problem takes place. This problem is that when we control the speed and rotational direction of the fan 16, two independent circuits (i.e., the signal conversion unit 10 and the direction determining unit 11) are required, each providing a set of signals (i.e., two sets of signals totally) to the microprocessor 12 such that the microprocessor 12 is required to provide a pin (i.e. the above-mentioned rotational speed pin 121) to specifically receive the signal for rotational speed and to provide another pin (i.e., the above-mentioned rotational direction pin 122) to specifically receive the signal for rotational direction. As a result, the layout space on the PCB is reduced and the cost is then increased.

From the above description, the prior art has the follow disadvantages:

1. The cost is increased.
2. The layout space on the PCB is reduced.
3. Two pins of the microprocessor 12 are required for two independent circuits and thus one pin of the microprocessor 12 is not available for another circuit.

Therefore, how to overcome the above problems and disadvantages is the focus which the inventor and the related manufacturers in this industry have been devoting themselves to.

SUMMARY OF THE INVENTION

Thus, to effectively overcome the above problems, the primary objective of the present invention is to provide a control circuit for speed and rotational direction of a fan, which can reduce the cost.

Another objective of the present invention is to provide a control circuit for speed and rotational direction of a fan, which can increase the layout space.

The yet another objective of the present invention is to provide a control circuit for speed and rotational direction of a fan, which can achieve the effect of controlling the speed and rotational direction of the fan through only one pin of the microprocessor such that the other pins of the microprocessor are available for other circuits.

To achieve the above objectives, the present invention provides a control circuit for speed and rotational direction of a fan, including a signal conversion unit, a processing unit, and a drive unit. The signal conversion unit has an output end and an input end, the input end receiving an input signal, wherein the signal conversion unit converts the input signal into a DC level signal which is transmitted to the processing unit through the output end of the signal conversion unit. One end of the processing unit is electrically connected the output end of the signal conversion unit and the other end of the processing unit is electrically connected to the drive unit, wherein the processing unit determines to generate a plurality of control signals for the fan based on the received DC level signal and at least one preset voltage therein. The drive unit has a plurality of switch modules which are driven based on the corresponding control signals to control the fan. Be means of the design of the control circuit of the present invention, the effect of cost reduction and an increase in the layout space can be achieved.

DETAILED DESCRIPTION OF THE INVENTION

The above objectives of the present invention and the features of structure and function of the present invention are described according to the preferred embodiments in figures.

Figure 1:
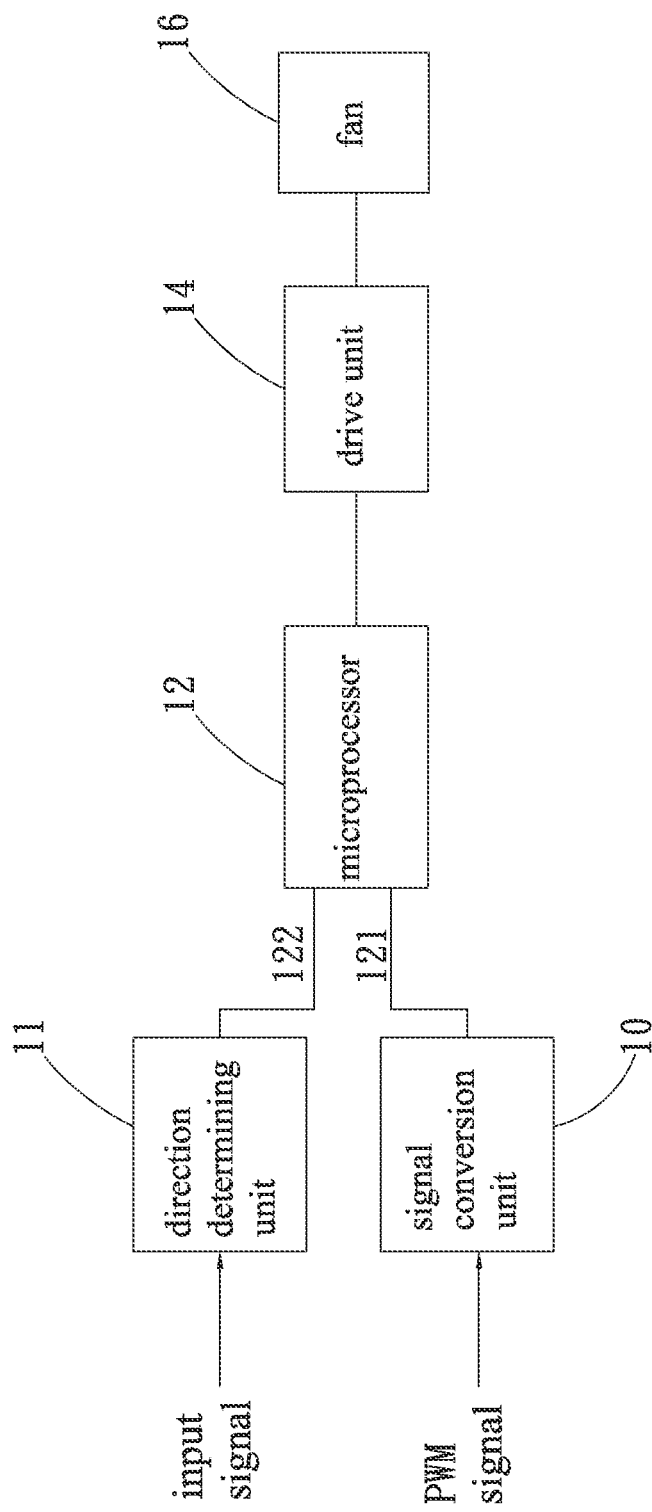
FIG. 1 is a block diagram showing the prior art.
Figure 2:
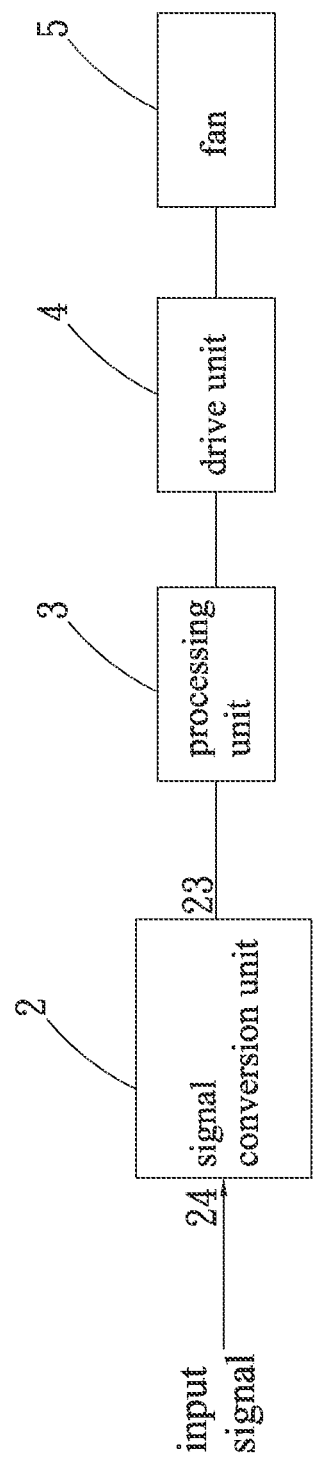
FIG. 2 is a block diagram showing a preferred embodiment of the present invention.
Figure 3:
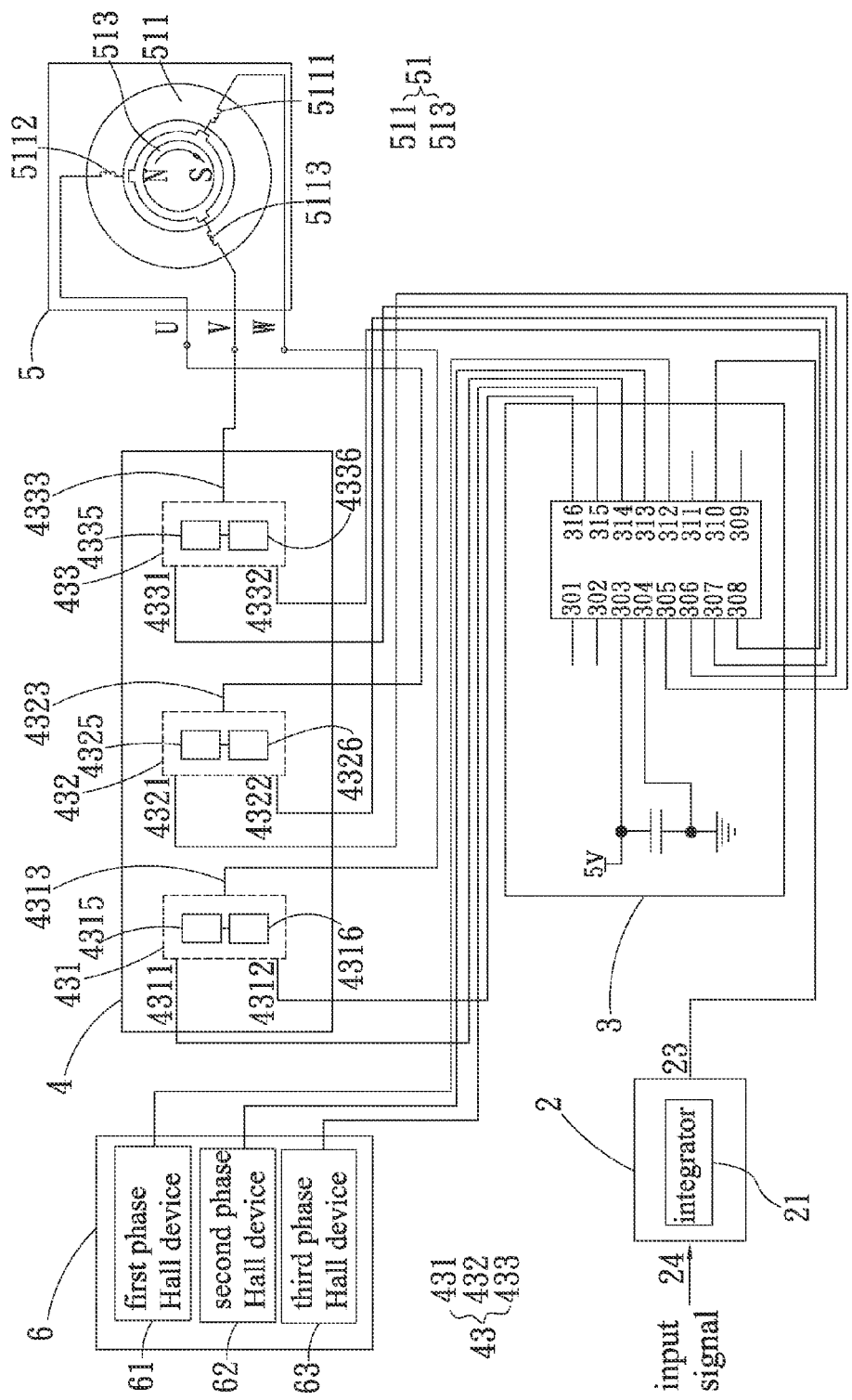
FIG. 3 is another block diagram showing a preferred embodiment of the present invention.

The present invention provides a control circuit for speed and rotational direction of a fan, referring to FIGS. 2 and 3 which are two block diagrams showing the preferred embodiment of the present invention. The control circuit is applied to a fan 5. In the preferred embodiment, the motor 51 of the fan 5 is a three-phase brushless motor for explanation, but not limited to this; the motor 51 also can use a single-phase brushless motor.

The above-mentioned control circuit includes a signal conversion unit 2, a processing unit 3, and a drive unit 4. The signal conversion unit 2 has an output end 23 and an input end 24. The input end 24 receives an input signal transmitted by an external device (e.g., a computer, an electronic device, not shown). In the preferred embodiment, the input signal is a PWM (Pulse Width Modulate) signal for explanation, but not limited to this. In practice, it may be a square signal.

Besides, the signal conversion unit 2 converts the received input signal into a DC level signal and has an integrator 21 therein. The integrator 21 integrates and transforms the PWM signal received by the input end 24 into the corresponding DC level signal. For example, a duty cycle of a PWM signal is 20%; the operating voltage of the signal conversion unit 2 is 5 V. Therefore, the DC level signal of 1 V is obtained by 5V×20%=1V. Then, the transformed DC level signal is transmitted to the processing unit 3 through the output end 23.

In addition, the above-mentioned integrator 21 in the preferred embodiment is a RC integrator formed by resistors and capacitors for explanation, but not limited to this. In practice, the users can use different integrators according to design requirement. For example, an integrator 21 formed by the OPA.

Further, the above-mentioned processing unit 3 is a microprocessor (MCU) for explanation, but not limited to this. In practice, other kind of processors can be used; for example, a DSP (Digital Signal Processor), or a processor consisting of a microprocessor and a DPS. One end of the processing unit 3 is electrically connected to the signal conversion unit 2 and the other end of the processing unit 3 is electrically connected to one end of the drive unit 4. Also, the processing unit 3 determines to generate a plurality of control signals for the operation (e.g., clockwise/counter-clockwise rotation and speed) of the fan 5 based on the received DC level signal and at least one preset voltage therein. In the preferred embodiment, the control signals includes a first control signal, a second control signal, a third control signal, a fourth control signal, a fifth control signal, and a six control signal. The first, second, third, fourth, fifth, and sixth control signals are used to control ON and OFF of the corresponding switch modules 43 in the drive unit 4.

The determination regarding the DC level signal and the preset voltage made by the processing unit 3 may be implemented by the following two embodiments. The preferred embodiment uses the second embodiment for explanation.

In the first embodiment, the received DC level signal is compared with a preset voltage in the above-mentioned processing unit 3, in which the preset voltage is 1.5V for explanation, but not limited to this.

If the processing unit 3 determines that the received DC level signal is 1V (i.e., 20% duty cycle×5V operating voltage=1V) which is less than the preset voltage of 1.5V, the processing unit 3 generates and transmits the control signal for the clockwise rotation of the fan 5 to the drive unit 4.

If the processing unit 3 determines that the received DC level signal is 1.5V (i.e., 30% duty cycle×5V operating voltage=1.5V) which is equal to the preset voltage of 1.5V, the processing unit 3 generates and transmits the control signal for the counter-clockwise rotation of the fan 5 to the drive unit 4.

If the processing unit 3 determines that the received DC level signal is 2V (i.e., 40% duty cycle×5V operating voltage=2V) which is greater than the preset voltage of 1.5V, the processing unit 3 generates and transmits the control signal for the rotational speed of the fan 5 to the drive unit 4, in which the processing unit 3 accordingly adjusts the rotational speed of the fan 5 based on the voltage value of the received DC level signal.

In the second embodiment, the preset voltage in the above-mentioned processing unit 3 includes a first preset voltage, a second preset voltage, and a third preset voltage, which are selected to be compared with the received DC level signal. For explanation, the first preset voltage is 1V; the second preset voltage is 1.5V; the third preset voltage is equal to or greater than 1.55V, but not limited to these. In practice, the users can design and adjust the voltage values of the first, second, and third preset voltages based on the requirement of clockwise/counter-clockwise rotation and speed of the fan 5 to correspondingly match the control of clockwise/counter-clockwise rotation and speed of the fan 5.

If the processing unit 3 determines that the received DC level signal is 0.75V (i.e., 15% duty cycle×5V operating voltage=0.75V) which is less than (or equal to) the first preset voltage of 1V, the processing unit 3 generates and transmits the control signal for the clockwise rotation of the fan 5 to the drive unit 4.

If the processing unit 3 determines that the received DC level signal is 1.25V (i.e., 25% duty cycle×5V operating voltage=1.25V) which is greater than the first preset voltage of 1V and less than (or equal to) the second preset voltage of 1.5V, the processing unit 3 generates and transmits the control signal for the counter-clockwise rotation of the fan 5 to the drive unit 4.

If the processing unit 3 determines that the received DC level signal is 1.75V (i.e., 35% duty cycle×5V operating voltage=1.75V) which is greater than (or equal to) the third preset voltage of 1.55V, the processing unit 3 generates and transmits the control signal for the rotational speed of the fan 5 to the drive unit 4, in which the processing unit 3 accordingly adjusts the rotational speed of the fan 5 based on the voltage value of the received DC level signal.

Please continue to refer to FIG. 3. In the embodiment for explanation, the above-mentioned processing unit 3 has sixteen pins 301-316, but not limited to this. In practice, the users may design and select the microprocessors with different specifications based on the real circuit and functional requirements; for example, the microprocessor with 8 pins, with 20 pins, or with 24 pins.

Of the above-mentioned processing unit 3, the first pin 301 receives a FG (Frequency Generator) signal; the third pin 303 is connected to one end of a capacitor to provide an operating voltage, for example, of 5V; the fourth pin 304 is connected to the ground reference and the other end of the capacitor; the fifth and sixth pins 305, 306 are used to output the third and fifth control signals, respectively; the seventh and eighth pins 307, 308 are used to output the fourth and sixth control signals, respectively; the 10th pin 310 is connected to the output end 23 of the signal conversion unit 2 to receive the DC level signal transformed by integration.

Besides, of the above-mentioned processing unit 3, the 12th and 13th pins 312, 313 are connected to the first phase Hall device 61 and the second phase Hall device 62 of a three-phase hall device 6, respectively; the 12th and 13th pins 312, 313 receive the induction signals generated at the induction rotators of the first and second phase Hall devices 61, 62, respectively; the 15th pin 315 of the processing unit 3 is connected to the third phase Hall device 63 of the three-phase Hall device 6 to receive the induction signal generated at the induction rotator of the third phase Hall device 63; the 14th pin 314 is used to output the first control signal and the 16th pin is used to output the second control signal.

Therefore, by means of the signal conversion unit 2 which converts the received input signal (i.e., the PWM signal) into the DC level signal and by means of the processing unit 3 which uses only one pin thereof to make the determination regarding the received DC level signal and the preset voltage, the effect of controlling the speed and rotational direction of the fan 5 can be achieved.

Besides, both of the speed control and rotational direction control of the fan 5 are through the same control wire (i.e., the connection wire between the output end 23 of the signal conversion unit 2 and the 10th pin 310 of the processing unit 3) and on the contrary, only one control signal is sufficient for the fan 5. Therefore, the effect of an increase in the layout space on PCB and cost reduction can be achieved.

Furthermore, the other end of the drive unit 4 is connected to the fan 5. The drive unit 4 drives and controls the fan 5 (e.g., the speed and rotational direction of the fan 5) based on the corresponding received control signals. The drive unit 4 has a plurality of switch modules 43 including a first switch module 431, a second switch module 432, and a third switch module 433. The first switch module 431 has a first end 4311, a second end 4312, a third end 4313, a first transistor switch 4315, and a second transistor switch 4316 connected to the first transistor switch 4315 in series. The first end 4311 of the first switch module 431 is connected to the 14th pin 314 of the processing unit 3 and transmits the received first control signal to the corresponding first transistor switch 4315. The second end 4312 of the first switch module 431 is connected to the 16th pin 316 of the processing unit 3 and transmits the received second control signal to the corresponding second transistor switch 4316. For explanation, the first and second transistor switches 4315, 4316 are a PMOS transistor and an NMOS transistor, respectively.

Please continue to refer to FIG. 3 as well as FIG. 2. The second switch module 432 has a first end 4321, a second end 4322, a third end 4323, a third transistor switch 4325, and a fourth transistor switch 4326 connected to the third transistor switch 4325 in series. The first end 4321 of the second switch module 432 is connected to the fifth pin 305 of the processing unit 3 and transmits the received third control signal to the corresponding third transistor switch 4325. The second end 4322 of the second switch module 432 is connected to the seventh pin 307 of the processing unit 3 and transmits the received fourth control signal to the corresponding fourth transistor switch 4326. For explanation, the third and fourth transistor switches 4325, 4326 are a PMOS transistor and an NMOS transistor, respectively.

Moreover, the above-mentioned third switch module 433 has a first end 4331, a second end 4332, a third end 4333, a fifth transistor switch 4335, and a sixth transistor switch 4336 connected to the fifth transistor switch 4335 in series. The first end 4331 of the third switch module 433 is connected to the sixth pin 306 of the processing unit 3 and transmits the received fifth control signal to the corresponding fifth transistor switch 4335. The second end 4332 of the third switch module 433 is connected to the eighth pin 308 of the processing unit 3 and transmits the received sixth control signal to the corresponding sixth transistor switch 4336.

For explanation, the fifth and sixth transistor switches 4335, 4336 are a PMOS transistor and an NMOS transistor, respectively. Besides, in the preferred embodiment, the first, second, third, fourth, fifth, and sixth transistor switches 4315, 4316, 4325, 4326, 4335, 4336 together constitute a three-phase full-bridge driving circuit for explanation, but not limited to this.

Therefore, the processing unit 3 transmits the first, second, third, fourth, fifth, and sixth control signals to the corresponding first, second, third, fourth, fifth, and sixth transistor switches 4315, 4316, 4325, 4326, 4335, 4336, respectively, based on the determination (i.e., clockwise rotation, counter-clockwise rotation, or rotational speed) to change the switching order of the first, second, third, fourth, fifth, and sixth transistor switches 4315, 4316, 4325, 4326, 4335, 4336 to control the operation of the fan 5 (e.g., clockwise/counter-clockwise rotation or speed of the fan 5).

Further, the above-mentioned fan 5 includes the motor 51 (i.e., three-phase brushless motor). The motor 51 has a stator set 511 and a rotator set 513. The stator set 511 has a first phase coil 5111 (i.e., the so-called W-phase coil), a second phase coil 5112 (i.e., the so-called U-phase coil), and a third phase coil 5113 (i.e., the so-called V-phase coil). For explanation, the first, second, and third phase coils 5111, 5112, 5113 are configured as a Y-connection in the preferred embodiment, but not limited to this; also can be configured as a delta connection. One end of the first phase coil 5111 (i.e., W-phase coil) is connected to the third end 4313 of the first switch module 431. One end of the second phase coil 5112 (i.e., U-phase coil) is connected to the third end 4323 of the second switch module 432. One end of the third phase coil 5113 (i.e., V-phase coil) is connected to the third end 4333 of the third switch module 433. The respective other ends of the first, second, and third phase coils 5111, 5112, 5113 are connected together.

Figure 4:
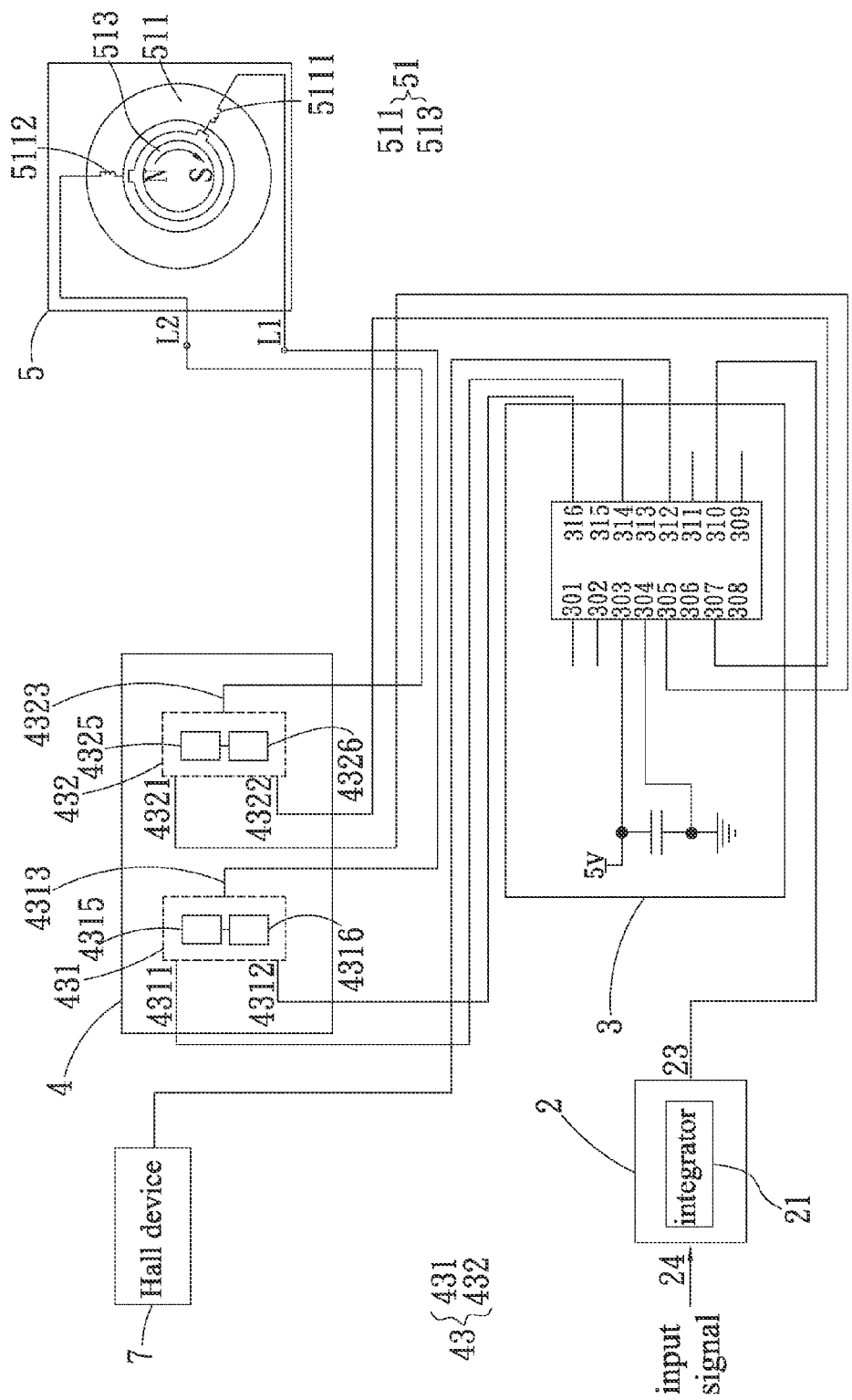
FIG. 4 is another block diagram showing a preferred embodiment of the present invention.

Besides, in practice, the users can design adjust the numbers of the Hall devices and switch modules 43 to match the number of phases of the motor stator beforehand according to the requirements of various brushless motors used in the fans. If a single-phase brushless motor is used in the control circuit of the present invention, the circuit design will be modified to have only one Hall device and two switch modules, as shown in FIG. 4; the 12th pin 312 of the processing unit 3 is connected to a Hall device 7 to receive the induction signal generated at the induction rotator of the Hall device 7; the first end 4311 of the first switch module 431 is connected to the 14th pin 314 of the processing unit 3 and transmits the received first control signal to the corresponding first transistor switch 4315; the second end 4312 of the first switch module 431 is connected to the 16th pin of the processing unit 3 and transmits the received second control signal to the corresponding second transistor switch 4316; the third end 4313 of the first switch module 431 is connected to one end of the first phase coil 5111 (i.e., the so-called L1-phase coil).

The first end 4321 of the second switch module 432 is connected to the fifth pin 305 of the processing unit 3 and transmits the received third control signal to the corresponding third transistor switch 4325. The second end 4322 of the second switch module 432 is connected to the seventh pin 307 of the processing unit 3 and transmits the received fourth control signal to the corresponding fourth transistor switch 4326. The third end 4323 of the second switch module 432 is connected to one end of the second phase coil 5112 (i.e., the so-called L2-phase coil).

Please refer to FIGS. 2 and 3. When the fan 5 operates, first the fan 5 rotates clockwise (i.e., in a positive direction). Meanwhile, the processing unit 3 determines based on the received DC level signal and the preset voltages therein to detect whether the input signal (i.e., PWM signal) transmitted by the external device changes. If the fan 5 is expected to rotate counter-clockwise at a speed (e.g., 2000 RPM), the external devices first transmits the input signal for counter-clockwise rotation of the fan 5 to the signal conversion unit 2. The received input signal is converted into the DC level signal through the signal conversion unit 2 and transmitted to the processing unit 3. If the processing unit 3 determines that the DC level signal is greater than the first preset voltage and less than or equal to the second preset voltage, the processing unit 3 generates and transmits the control signal for the counter-clockwise rotation of the fan 5 to the drive unit 4 to make the drive unit 4 drive and control the counter-clockwise rotation of the fan 5 based on the corresponding received control signal.

After that, the above-mentioned external device transmits the input signal for controlling the rotational speed of the fan 5 to the signal conversion unit 2. The received input signal is converted into the DC level signal through the signal conversion unit 2 and transmitted to the processing unit 3. If the processing unit 3 determines that the DC level signal is greater than or equal to the third preset voltage, the processing unit 3 generates and transmits the control signal for the rotational speed of the fan 5 to the drive unit 4 to make the drive unit 4 drive and control the fan 5 to rotate at 2000 RPM based on the corresponding received control signal. Thus, the effect of cost reduction and an increase in the layout space on PCB can be achieved.

Consequently, by means of the design of the control circuit of the present invention, the controls of the rotational speed and rotational direction of the fan 5 can be effectively implemented through the same control wire. In other words, the processing unit 3 using only one pin thereof to be connected to the signal conversion unit 2 determines the received signal to achieve the effect of controlling the speed and rotational direction of the fan 5 and further achieve the effect of cost reduction and an increase in the layout space on PCB.

In summary, the present invention has the following advantages over the prior art.
1. The cost is decreased.
2. The layout space on the PCB is increased.
3. The processing unit 3 using only one pin thereof to be connected to the signal conversion unit 2 determines the received signal to achieve the effect of controlling the speed and rotational direction of the fan 5 and further achieve the effect of cost reduction and an increase in the layout space on PCB.

The above description is only about the preferred and feasible embodiments of the present invention. It will be understood that all variations of the above methods, shapes, structures, and apparatus according to the present invention should be embraced by the scope of the appended claims of the present invention.

What is claimed is:

1. A control circuit for speed and rotational direction of a fan, including:
   a signal conversion unit having an output end and an input end receiving an input signal, wherein the signal conversion unit converts the input signal received by the input end into a DC level signal;
   a processing unit, one end thereof electrically connected to the output end of the signal conversion unit, wherein the processing unit determines to generate a plurality of control signals for the fan based on the received DC level signal and at least one preset voltage therein; and
   a drive unit electrically connected to the other end of the processing unit, wherein the drive unit has a plurality of switch modules which drive and control the fan based on the corresponding received control signals, wherein the switch modules include:
   a first switch module having a first end, a second end, a third end, a first transistor switch, and a second transistor switch, wherein the first end transmits a received first control signal to the corresponding first transistor switch, wherein the second end transmits a received second control signal to the corresponding second transistor switch;
   a second switch module having a first end, a second end, a third end, a third transistor switch, and a fourth transistor switch, wherein the first end of the second switch module transmits a received third control signal to the corresponding third transistor switch, wherein the second end of the second switch module transmits a received fourth control signal to the corresponding fourth transistor switch; and
   a third switch module having a first end, a second end, a third end, a fifth transistor switch, and a sixth transistor switch, wherein the first end of the third switch module transmits a received fifth control signal to the corresponding fifth transistor switch, wherein the second end of the third switch module transmits a received sixth control signal to the corresponding sixth transistor switch;
   wherein the processing unit is a microprocessor;
   wherein the processing unit has sixteen pins, wherein the third pin is connected to one end of a capacitor to provide an operating voltage, wherein the fourth pin is connected to a ground reference and the other end of the capacitor, wherein the fifth pin is connected to the first end of the second switch module to output the third control signal, wherein the sixth pin is connected to the first end of the third switch module to output the fifth control signal, wherein the seventh pin is connected to the second end of the second switch module to output the fourth control signal, wherein the eighth pin is connected the second end of the third switch module to output the sixth control signal, wherein the 10th pin is connected to the output end of the signal conversion unit to receive the DC level signal, wherein the 14th pin is connected to the first end of the first switch module to output the first control signal, wherein the 16th pin is connected to the second end of the first switch unit to output the second control signal.

2. The control circuit according to claim 1, wherein the signal conversion unit has an integrator therein, wherein the integrator integrates and transforms the input signal received by the input end into the corresponding DC level signal transmitted to the processing unit through the output end, wherein the input signal is a duty cycle of a PWM signal.

3. The control circuit according to claim 1, wherein the fan includes a motor having a stator set and a rotator set, wherein the stator set has a first phase coil, a second phase coil, and a third phase coil, wherein one end of the first phase coil is connected to the third end of the first switch module, wherein one end of the second phase coil is connected to the third end of the second switch module, wherein one end of the third phase coil is connected to the third end of the third switch module, wherein the other ends of the first, second, and third phase coils are connected together.

4. The control circuit according to claim 1, wherein the processing unit generates and transmits the control signal for the clockwise rotation of the fan to the drive unit, if the processing unit determines that the DC level signal is less than the preset voltage therein.

5. The control circuit according to claim 1, wherein the processing unit generates and transmits the control signal for the counter-clockwise rotation of the fan to the drive unit, if the processing unit determines that the DC level signal is equal to the preset voltage therein.

6. The control circuit according to claim 1, wherein the processing unit generates and transmits the control signal for the rotational speed of the fan to the drive unit, if the processing unit determines that the DC level signal is greater than the preset voltage therein.

7. The control circuit according to claim 1, wherein the preset voltage of the processing unit includes a first preset voltage, a second preset voltage, and a third preset voltage, wherein the processing unit generates and transmits the control signal for the clockwise rotation of the fan to the drive unit, if the processing unit determines that the DC level signal is less than or equal to the first preset voltage.

8. The control circuit according to claim 7, wherein the processing unit generates and transmits the control signal for the counter-clockwise rotation of the fan to the drive unit, if the processing unit determines that the DC level signal is greater than the first preset voltage and less than or equal to the second preset voltage.

9. The control circuit according to claim 7, wherein the processing unit generates and transmits the control signal for the rotational speed of the fan to the drive unit, if the processing unit determines that the DC level signal is equal to or greater than the third preset voltage.

* * * * *